US009442577B2

(12) United States Patent
Flament et al.

(10) Patent No.: US 9,442,577 B2
(45) Date of Patent: Sep. 13, 2016

(54) SYSTEM FOR INPUTTING GRAPHICAL ELEMENTS

(75) Inventors: Bruno Flament, St Julien de Ratz (FR); Yanis Caritu, Saint Joseph la Riviere (FR)

(73) Assignee: Movea, Grenoble (FR)

(*) Notice: Subject to any disclaimer, the term of this patent is extended or adjusted under 35 U.S.C. 154(b) by 505 days.

(21) Appl. No.: 13/335,716

(22) Filed: Dec. 22, 2011

(65) Prior Publication Data
US 2012/0169726 A1 Jul. 5, 2012

(30) Foreign Application Priority Data

Dec. 23, 2010 (FR) ...................................... 10 61181

(51) Int. Cl.
*G06F 3/033* (2013.01)
*G06F 3/0354* (2013.01)
*G06K 9/22* (2006.01)

(52) U.S. Cl.
CPC ............ *G06F 3/03545* (2013.01); *G06K 9/222* (2013.01)

(58) Field of Classification Search
CPC .... A61C 13/0004; A61C 7/00; A61C 7/002; A61C 7/08; A61C 9/00; A61C 9/004; A61C 9/008; G06F 3/03545; G06K 9/222
USPC ................................................. 345/173–183
See application file for complete search history.

(56) References Cited

U.S. PATENT DOCUMENTS

| 6,212,296 B1* | 4/2001 | Stork et al. ................... 382/188 |
| 2010/0013860 A1* | 1/2010 | Mandella et al. ............ 345/650 |

FOREIGN PATENT DOCUMENTS

| EP | 0 666 543 A2 | 8/1995 |
| EP | 1 462 926 A2 | 9/2004 |
| GB | 2 270 740 A | 3/1994 |
| GB | 2 306 669 A | 5/1997 |
| WO | WO 2009/156476 A2 | 12/2009 |

OTHER PUBLICATIONS

French Search Report and Written Opinion dated Sep. 8, 2011, issued in priority French Application No. 1061181.

* cited by examiner

*Primary Examiner* — Kumar Patel
*Assistant Examiner* — Insa Sadio
(74) *Attorney, Agent, or Firm* — Stroock & Stroock & Lavan LLP

(57) ABSTRACT

A system for inputting graphical elements Includes a substantially pen-shaped peripheral device (PD); means (DIG) for digitizing graphical elements produced by a first end (END1) of the peripheral device (PD); and display means (DISP) suitable for displaying the said graphical elements produced. The system also includes means (MSR) for measuring signals representative of the movement executed by the peripheral device (PD), which includes a gyrometer (G) with at least two measurement axes providing angular speeds according to the said axes, linked in a fixed manner to the said peripheral device (PD). Means (POS) for positioning, on the display means (DISP), a pointing element (PT), based on the said angular speeds, is also provided, together with means (ACT) for activating/deactivating the positioning means (POS).

12 Claims, 2 Drawing Sheets

SYSTEM FOR INPUTTING GRAPHICAL ELEMENTS

THE FIELD OF THE INVENTION

The invention relates to a system for inputting graphical elements, a specific embodiment of which comprises a substantially pen-shaped peripheral device.

BACKGROUND OF THE INVENTION

In general, a number of systems for the electronic input of graphical elements comprising a substantially pen-shaped device exist, such as digital pens or dedicated stylus/support sets (or one that is instrumented to locate the tip of the stylus), for example a stylus/touch-screen device set or a stylus/graphics tablet device set (without a screen).

Dedicated stylus/support sets require usage on the said support, which is restrictive, costly and of limited use spatially.

Also known are digital pens as described, for example, in the U.S. Pat. No. 5,902,968, which discloses a digital pen equipped with a triaxial accelerometer and a triaxial gyrometer, and means for filtering the measurements delivered by the accelerometer and the gyrometer. This filtered data is then converted by changing the frame of reference.

U.S. Patent Publication No. 2006/0088215 A1 discloses a handwriting recognition system comprising means that are sensitive to analogue input signals representative of the movement of a handwriting device intended to be held in one hand and sampling means to deliver signals representative of the acceleration of the handwriting device along at least two axes, at a determined capture sampling rate. The system described additionally comprises filtering means for filtering these sampled signals and a classifier for comparison with a template representative of characters formed.

Such systems provide only for recognizing graphical characters in series, but cannot replace a keyboard and mouse.

Specifically, a known electronic pen does not allow the user to use this same pen as a screen pointer management tool even when the user provides an absolute positioning of the tip of the pen. For example, current optical pens implement functions for digitizing handwriting and drawings, i.e. graphical elements, by an optical positioning technology for the trail of the pen tip on an instrumented surface, but these optical pens cannot be used to control the pointer in the air, for example to deliver a presentation.

SUMMARY OF THE INVENTION

An object of the invention is to propose such a function, which, when combined with an electronic pen for digitizing a gesture representative of a graphical element such as one or more characters or a drawing, offers an advantage to its user.

Moreover, an electronic pen based on an estimated relative trajectory is used to produce plots or characters that are estimated or calculated from the trajectory, one after the other, sequentially and without direct and simple access nor a positioning of one with respect to the other.

Although systems without fixed-reference frame equipment can carry out a mapping between the position of the digital pen tip on the support and the estimate of this position in the virtual sheet, systems with means fitted on the digital pen function only in a relative manner and are subject to a drift in position.

An aim of the invention is thus to overcome these various issues, and notably to replace a keyboard-and-mouse set.

There is proposed, according to one aspect of the invention, a system for inputting graphical elements comprising:
  a substantially pen-shaped peripheral device;
  means for digitizing graphical elements produced by a first end of the peripheral device;
  display means suitable for displaying the said graphical elements produced;
  means for measuring signals representative of the movement executed by the said peripheral device, comprising a gyrometer with at least two measurement axes providing angular speeds according to the said axes, linked in a fixed manner to the said peripheral device;
  means for positioning, on the display means, a pointing element, based on the said angular speeds; and
  means for activating/deactivating the said positioning means.

Such a system can be used to position a pointing means on the display means, and to switch between pointing and graphics (plotting or character recognition), and hence the substantially pen-shaped peripheral device can replace a keyboard and a mouse.

It is thus possible for a user to draft a document in real time containing graphical elements, such as characters, with a pointing arrangement on the display means, such as a screen, in order to modify or structure the document, and to change position on the screen at any moment during the design of the document.

An embodiment of the invention therefore proposes the relevant and novel addition of a pointing device (for example with a gyrometer or with an optical mouse mode) with which, through slight movements of the digital pen, one can be positioned where desired. This can include a return or a feedback from the system, such as the display of a cursor on the screen, thereby allowing the user in response to guide their positioning gesture, for example guiding a cursor on the screen.

An embodiment of the invention provides for an absolute positioning of the pointer, i.e. of the cursor on the screen, for example, in order that the user can designate the place where they wish to write or act, for example to delete or structure a set of particular characters. An embodiment of the present invention brings about this advantage with respect to existing systems which have a limitation by not being capable of determining an absolute position of the pointer.

The sensors employed for the pointing function form part of a sensor assembly which is also used to carry out a handwriting digitization function, by estimating the trail of the pen tip, and/or by mapping the signals arisen from the handwriting gestures with a pre-learned or predetermined database.

In a wider sense, the system can also be considered to have an actuation means, such as a robotized arm holding a spray gun and having the purpose of reproducing a gesture to form a graphical element (somewhat like on a screen). Controlling the position of the cursor with the pointing arrangement (therefore in a relative manner but supervised by a person watching) becomes: controlling the positioning of the robotized arm before it plots a graphical element. Thus, the positioning of a pointing element can be seen either as the positioning of the end of the robotized arm or the positioning of a pointing element (cursor) on a display screen.

Moreover, for a necessary interaction like a pointing action on a screen, a gesture may have a minimum of two degrees of freedom. The least expensive component to implement this function effectively is a gyrometer with two measurement axes (angular inclination and azimuth speeds directly converted into displacement dx (abscissas), dy (ordinates) on the screen). Simultaneously, these measurement means are sufficient to characterize characters, notably those comprising a greater variation in orientation than in translation. In summary, this first embodiment allows the pen to provide a function equivalent to a keyboard-and-mouse set at a reduced cost (i.e., using very few sensors).

In one embodiment, the said means for digitizing graphical elements comprise:
- at least one database with data representative of characters executed by the said first end; and
- means for mapping the said measured signals with the said data representative of characters in the said database.

Thus, it is possible to carry out pointing and positioning on a screen to produce a written document without the aid of a keyboard.

In one embodiment, the system additionally comprises means of learning and/or recording the database, to create at least a part of the said database.

Thus the database is not necessarily a predefined database, but can be, at least partly, learned or formed on-the-fly, and thus can be dependent on and tailored to, at least partly, the user, thereby limiting the character recognition error rate, and allowing the "gestural vocabulary" to be expanded.

When a character is formed by the device, the movement to produce it can include two types of information:
- the position trajectory of the device which comprises three degrees of freedom (three Cartesian coordinates in a three-dimensional frame of reference), and
- the orientation trajectory of the device which also comprises three degrees of freedom (three angles of orientation, for example, the angle about the longitudinal axis of the pen, and about its two transverse axes).

These six degrees of freedom have a relative significance which depends on the character. Gyrometers, accelerometers, magnetometers and optical sensors are adapted to characterize (in a manner integrated on the device) more specifically an orientation or its derivatives in time. Only the accelerometers and optical sensors are capable, furthermore, of accounting for time derivatives of translation, and therefore, by suitable processing, for the translation itself.

In one embodiment, the said measurement means comprise an accelerometer with at least two measurement axes.

Thus, unlike the previous embodiment, in which the set of recognizable characters could be limited since the gyrometers alone do not sense the translation of the device, the addition of an accelerometer with at least two measurement axes provides for including in the database characters formed with a translation component which would be distinguishing, either to characterize characters which are difficult to distinguish by orientation alone, or to strengthen the recognition which may rely on degrees of freedom belonging to both types of characteristic trajectories (orientation and translation).

According to one embodiment, the said accelerometer is arranged close to the said first end.

Having the accelerometer close to the said first end may mean being close to the plotting point of the character. Being distanced from the first end or tip may mean being distanced from the trail and being potentially disturbed by accelerations other than those directly related to the trail. Corrective means related to the physical composition laws for the movements can be included if it is impracticable to place the accelerometer close to the first end.

According to one embodiment, the said measurement means comprise correction means suitable for replacing the measurements of the accelerometer with measurements corrected by combining, by application of the composition law for the movement, the measurements of the said accelerometer with the measurements of the said gyrometer in order to take into account the distance of the said accelerometer from the said first end.

Thus, when the accelerometer cannot be positioned as close as desired to the first end, its measurements are corrected so as to simulate the installation of an accelerometer close to the first end.

In one embodiment, the said measurement means comprise a magnetometer with at least two measurement axes.

The presence of such a magnetometer provides for securing the angular azimuth (horizontal) position of the substantially pen-shaped peripheral device in an absolute manner and provides for bringing about an even stronger recognition of gestures, given its capability of representing orientations.

According to one embodiment, the system additionally comprises means for determining a movement-start instant and a movement-end instant representative of at least one character executed by the said first end.

These determination means can, for example, comprise a contact sensor, a force sensor, or a proximity sensor, fitted to the said first end, or even an actuator on the body of the peripheral device which, although less practical than the previous means, would enable users to mark the start and end times of their plots themselves.

Thus it is possible to carry out a character-by-character, syllable-by-syllable or word-by-word recognition, if a movement-start and movement-end instant are determined, representative of at least one character executed by the said first end. Compared to a continuous recognition of characters, the advantage is to break up the informational signal of the gesture into portions and strengthen the recognition since the split window undoubtedly contains the finished and whole character or characters.

In one embodiment, the said measurement means comprise a force sensor with at least two measurement axes, fitted to the said first end.

The use of a force sensor with at least two measurement axes provides for taking into account the dynamics of pressing the pen during the plotting of characters and the frictional forces at play between the said first end and a support, representing additional information with respect to the movements of the substantially pen-shaped peripheral device. The recognition is stronger.

For example, the said digitization means are adapted to take into account information representative of a three-dimensional aspect, and the said display means are suitable for producing a three-dimensional aspect display.

Thus, one can use the invention in a display context with a three-dimensional aspect.

According to one embodiment, the said force sensor is suitable for determining a movement-start instant and a movement-end instant representative of at least one character executed by the said first end.

In one embodiment, the said means for mapping the said measured signals with the said data representative of written characters in the database are adapted to use a hidden Markov model, linear time warping, dynamic time warping, or a neural network.

These different ways of producing the means for mapping the said measured signals with the said data representative of characters in the database are known, proven, reliable and inexpensive to produce.

According to another embodiment, the said means for digitizing graphical elements comprise:
- means for the two-dimensional representation of the said graphical elements; and
- means for recognizing characters from the said two-dimensional representation.

Thus, the system can operate by plot reconstructing plots.

For example, the said character recognition means comprise optical character recognition means.

It is possible to use known OCR (Optical Character Recognition) principles.

BRIEF DESCRIPTION OF THE DRAWINGS

The invention will be better understood on studying a few embodiments described by way of examples which are not at all limiting and which are illustrated by the accompanying drawings in which.

DETAILED DESCRIPTION

In both drawings, items having the same references are similar.

Figure 1:
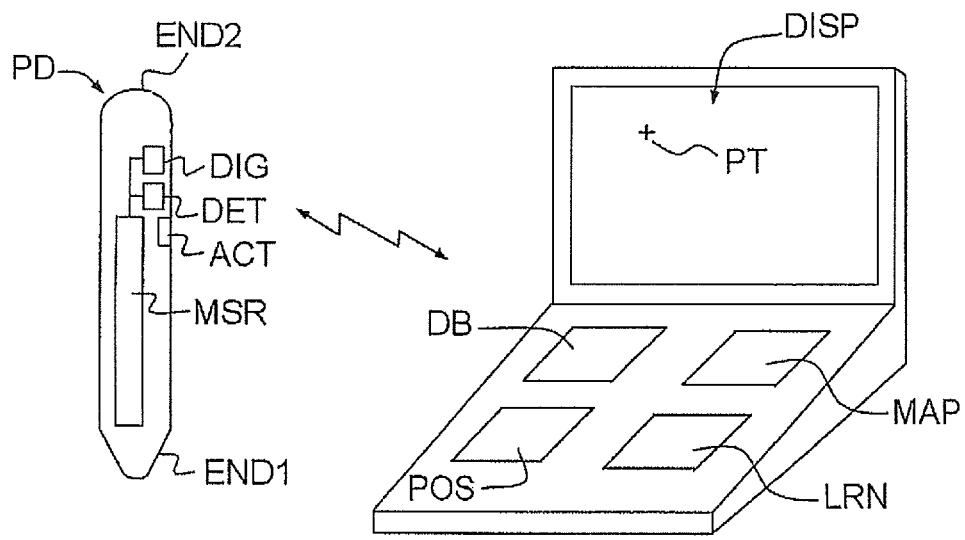
FIG. 1 illustrates a system for recognizing graphical characters according to one aspect of the invention.

In FIG. 1, there is represented a system for recognizing graphical characters comprising a substantially pen-shaped peripheral device PD equipped with means MSR for measuring signals representative of the movement executed by the substantially pen-shaped peripheral device PD. The movement can be executed in the air or on a support.

The system for recognizing graphical characters also comprises a database DB with data representative of characters executed by a first end END1 of the peripheral device PD, corresponding to the tip of the pen, and a module MAP for mapping the measured signals with the data representative of characters stored in the database DB.

The peripheral device PD also comprises a module DIG for digitizing the graphical elements produced by the first end END1 of the peripheral device PD.

There are known, notably, three main categories of known examples:
- a stylus used to draw graphical elements on a tablet or pad type support electronically equipped to detect the position of the end of the stylus representing the tip, and to obtain a signal representative of the abscissa x(t) and ordinate y(t) coordinates in the plane of the support. The tablet can be a tablet with coding by inductive detection of a coil at the tip of the stylus. The pad can also be equipped with a capacitive detection system. Systems with optical grazing beams have also been perfected.
- systems integrating the plotting support with a device of transmitting sources, enabling a triangulation to be performed with the tip of the pen (ultrasound sources, infrared sources, electromagnetic sources).
- systems not involving any instrumentation except that of the pen: optical device at the tip of the pen to measure the optical flow of the running texture during plotting (measurement of speed Vx, Vy of movement of the tip on the support along two axes of the support), measurement of the frictional force of the tip collinear with the speed, onboard inertial measurements (via accelerometers, magnetometers and gyrometers).

These items can, for example, be built into the peripheral device PD, or on an associated mobile terminal such as a portable computer.

The system for recognizing graphical characters additionally comprises a display screen DISP suitable for displaying the recognized graphical characters, and a positioning module POS, on the display screen DISP, for positioning a pointing element PT, such as a cursor, based on the movement of the first end END1 of the peripheral device PD (on the said surface).

The positioning device POS is implemented with the aid of a gyrometer G with at least two measurement axes, enabling a positioning of the cursor to be performed with an air pointing action (i.e. without a contact surface) and sensitive to angles, placed on the first end END1 of the peripheral device PD, and sensitive to translation speeds. This pointing action, which makes use of a gyrometric measurement, can be carried out by pointing directly towards the desired position or by lifting the pen from the plotting support towards a direction that allows the user to carry out desired angular variations in order to control the movement of the focus point or pointing element PT on the display screen DISP. It is to be noted that usage which involves drafting a graphical element, then repositioning the cursor or pointing element PT on the display screen DISP by lightly raising the pen from the sheet (or by activating pointing mode) via a slight movement of the hand which remains rested on the sheet is particularly advantageous.

Figure 3:
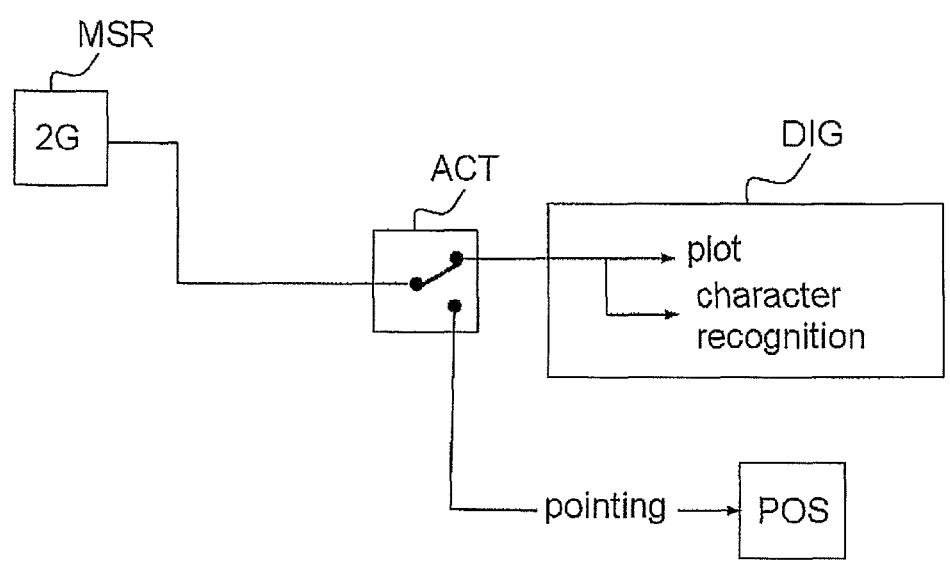
FIG. 3 illustrates the activating/deactivating of an embodiment positioning means.

The system therefore additionally comprises means ACT for activating/deactivating the said positioning means POS, the operation of which is illustrated schematically in FIG. 3.

Such a system is used to replace a keyboard and mouse, and operates continuously for the recognition of graphical characters.

The presence of a learning module LRN, which is optional, provides for the capability of making the system learn database data representative of characters executed by the first end END1 of the peripheral device PD, and thus for making the system better tailored to the user, thereby limiting character recognition errors.

The peripheral device PD is also equipped with a determination module DET, which is optional, for determining a movement-start instant and a movement-end instant representative of at least one character executed by the said first end END1. The determination module DET is used to carry out a character-by-character recognition, thereby limiting recognition errors. The determination module DET can for example be a finger-operated pushbutton.

The measurement module MSR can, for example, comprise a gyrometer G with two measurement axes and an accelerometer A with three measurement axes, or a gyrometer G with three measurement axes and an accelerometer A with three measurement axes. Thus, the first embodiment provides for limiting the number of sensitive gyrometric axes, thereby limiting the cost of the system and also its power consumption. The second embodiment provides for improving the robustness of the processing, notably for gestures of which the three angular degrees of freedom are represented equally (i.e. none can be neglected).

Figure 2:
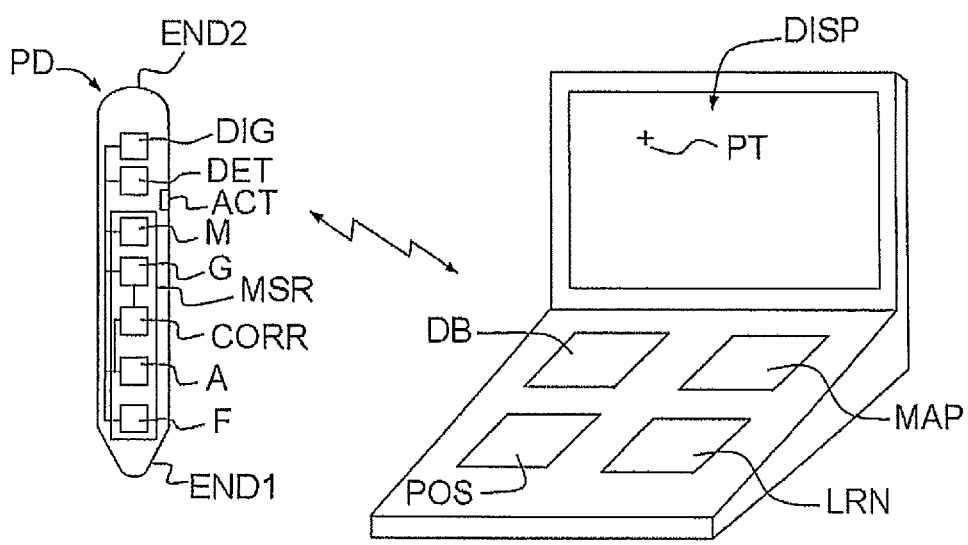
FIG. 2 illustrates one embodiment of a system of FIG. 1.

The embodiment of FIG. 2 represents the embodiment comprising all of these sensors, and an optional force sensor F with at least two measurement axes, fitted at the said the first end END1.

The module MAP for mapping the measured signals with the data representative of characters in the database DB is adapted to use, for example, a hidden Markov model, linear time warping, dynamic time warping, or a neural network.

These different possibilities are highly reliable and well mastered.

When the system comprises an accelerometer A, the latter is advantageously arranged close to the said first end END1, enabling it to be near the plotting point of the character which the tip represents. Being distanced from the tip means being distanced from the trail and means being potentially disturbed by accelerations other than those directly related to the trail. Corrective means related to the physical composition laws for the movements can be included if it is impossible to place the accelerometer at the end.

In a display context with a three-dimensional aspect, the digitization module DIG can be adapted to take into account information representative of such a three-dimensional aspect, and the display screen DISP adapted to produce a three-dimensional aspect display.

The pointing is:

either two-dimensional (2D): a graphical element called a 2D cursor or pointing element PT moves in the abscissa X and ordinate Y directions on the reference frame related to the display screen DISP in a flat graphical universe (e.g. text document, presentation, spreadsheet, two-dimensional (2D) drawing, photomontage or videomontage tools). The pointing arrangement provides for repositioning this 2D cursor at the place where it is desired to establish a new action (insert a character, delete a word, restructure a line drawn on a plan, etc).

or three-dimensional (3D): a graphical element called a 3D cursor or pointing element PT moves in the abscissa X, ordinate Y and depth Z directions in a three-dimensional graphical scene (e.g. 3D scene in a video game, in a 3D CAD tool, etc). The movement of the cursor or pointing element PT is no longer a movement in the plane of the display screen DISP but a movement of the projection on the three-dimensional object pointed at. When there is no longer an object in the pointed direction, the cursor is returned to infinity (actually a distant plane but still visible), or, in other words, the cursor is positioned, in the depth sense, on the first object that it encounters. The start point of this direction can be the position of the virtual camera which projects the scene.

The force sensor F can be used to determine a movement-start instant and movement-end instant representative of at least one character executed by the said first end.

As a variant, the means DIG for digitizing the graphical elements can comprise:

means for the two-dimensional representation of the said graphical elements; and means for recognizing characters from the said two-dimensional representation.

Therefore, the system can also operate by reconstructing plots, for example, through optical character recognition (OCR).

The invention claimed is:

1. A system for inputting graphical elements comprising:
   a substantially pen-shaped peripheral device;
   a digitizer configured to digitize graphical elements produced by a first end of the peripheral device; and
   a display configured to display said produced graphical elements;

wherein the system further comprises:
   a measurement device configured to measure signals representative of the movement executed by said peripheral device, the measurement device comprising a gyrometer with at least two measurement axes providing angular speed measurements according to said axes of the gyrometer, and an accelerometer with at least two measurement axes providing acceleration measurements according to said axes of the accelerometer, the measurement device linked in a fixed manner to said peripheral device;
   a pointing element positioning system configured to position, on the display, a pointing element, based on said angular speed measurements; and
   a switch for activating and deactivating the pointing element positioning system;
   wherein said measurement device is further configured to replace the measurements of the accelerometer with measurements corrected by combining, by application of a composition law for the movement, the measurements of said accelerometer with the measurements of said gyrometer in order to take into account a distance of said accelerometer from said first end.

2. The system according to claim 1, wherein the digitizer comprises:
   at least one database with data representative of characters executed by said first end; and
   a character mapping system configured to map said measured signals with said data representative of characters in said database.

3. The system according to claim 2, further comprising a learning device to create at least a portion of said database.

4. The system according to claim 2, wherein the character mapping system is further configured to use a hidden Markov model, linear time warping, dynamic time warping, or a neural network.

5. The system according to claim 1, wherein said accelerometer is arranged close to said first end.

6. The system according to claim 1, wherein said measurement device further comprises a magnetometer with at least two measurement axes.

7. The system according to claim 1, wherein the system is further configured to determine a movement-start instant and a movement-end instant representative of at least one character executed by said first end.

8. The system according to claim 1, wherein the measurement device further comprises a force sensor with at least two measurement axes, fitted to said first end.

9. The system according to claim 8, wherein said force sensor is configured to determine a movement-start instant and a movement-end instant representative of at least one character executed by said first end.

10. The system according to claim 1, wherein the digitizer is further configured to take into account information representative of a three-dimensional aspect, and the display is configured to produce a three-dimensional aspect display.

11. The system according to claim 1, wherein the digitizer is further configured to store two-dimensional representations of said graphical elements and to recognize characters from the two-dimensional representations.

12. The system according to claim 11, wherein said digitizer further comprises an optical character recognition system.

* * * * *